US008804721B2

(12) United States Patent  (10) Patent No.: US 8,804,721 B2
He et al.  (45) Date of Patent: Aug. 12, 2014

(54) MULTI-STREAM COMMUNICATION

(75) Inventors: Ting He, Yorktown Heights, NY (US); Vasileios Pappas, Yorktown Heights, NY (US); Dinesh Verma, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 13/222,680

(22) Filed: Aug. 31, 2011

(65) Prior Publication Data

US 2013/0051300 A1  Feb. 28, 2013

(51) Int. Cl.
*H04L 12/28* (2006.01)
(52) U.S. Cl.
USPC ............................ 370/390; 370/312; 370/432
(58) Field of Classification Search
USPC ......................................... 370/312, 432, 390
See application file for complete search history.

(56) References Cited

U.S. PATENT DOCUMENTS

| | | | |
|---|---|---|---|
| 6,512,776 B1 | 1/2003 | Jones et al. | |
| 6,973,081 B1* | 12/2005 | Patel | 370/390 |
| 7,133,922 B1 | 11/2006 | She et al. | |
| 7,546,355 B2 | 6/2009 | Kalnitsky | |
| 2003/0225845 A1 | 12/2003 | Hong | |
| 2004/0252691 A1* | 12/2004 | Hori et al. | 370/390 |
| 2005/0198097 A1* | 9/2005 | Kalnitsky | 709/200 |
| 2006/0020974 A1* | 1/2006 | Birnbaum et al. | 725/50 |
| 2007/0177592 A1* | 8/2007 | Mooney et al. | 370/390 |
| 2008/0282295 A1 | 11/2008 | Gabriel et al. | |
| 2009/0083811 A1 | 3/2009 | Dolce et al. | |
| 2009/0168679 A1* | 7/2009 | Benjamim et al. | 370/312 |
| 2011/0164614 A1* | 7/2011 | Begeja | 370/390 |
| 2011/0191404 A1 | 8/2011 | Kako | |
| 2013/0028118 A1* | 1/2013 | Cherian et al. | 370/252 |

FOREIGN PATENT DOCUMENTS

| | | |
|---|---|---|
| EP | 1 269 729 | 1/2003 |
| EP | 1 704 490 | 9/2006 |
| EP | 1 961 156 | 8/2008 |
| EP | 197 9 826 | 10/2008 |
| WO | WO 01/65817 | 9/2001 |
| WO | WO 2005/069862 | 8/2005 |
| WO | WO 2007/069988 | 6/2007 |
| WO | WO 2007/084809 | 7/2007 |
| WO | WO 2009/076121 | 6/2009 |
| WO | WO 2012/012155 | 1/2012 |
| WO | WO 2012/142428 | 10/2012 |

OTHER PUBLICATIONS

GB Search Examination Report Dated Nov. 29, 2012.

* cited by examiner

*Primary Examiner* — Mark Rinehart
*Assistant Examiner* — Mang Yeung
(74) *Attorney, Agent, or Firm* — F. Chau & Associates, LLC

(57) ABSTRACT

A method for reducing bandwidth used in multiple transmissions on a cellular network includes mapping at least one request of at least one end-device to a unicast channel between server and an intermediary in the network, creating a correlated multicast communication channel between the intermediary and the at least one end-device, and transferring data from the unicast channel to a multicast channel at the intermediary.

16 Claims, 4 Drawing Sheets

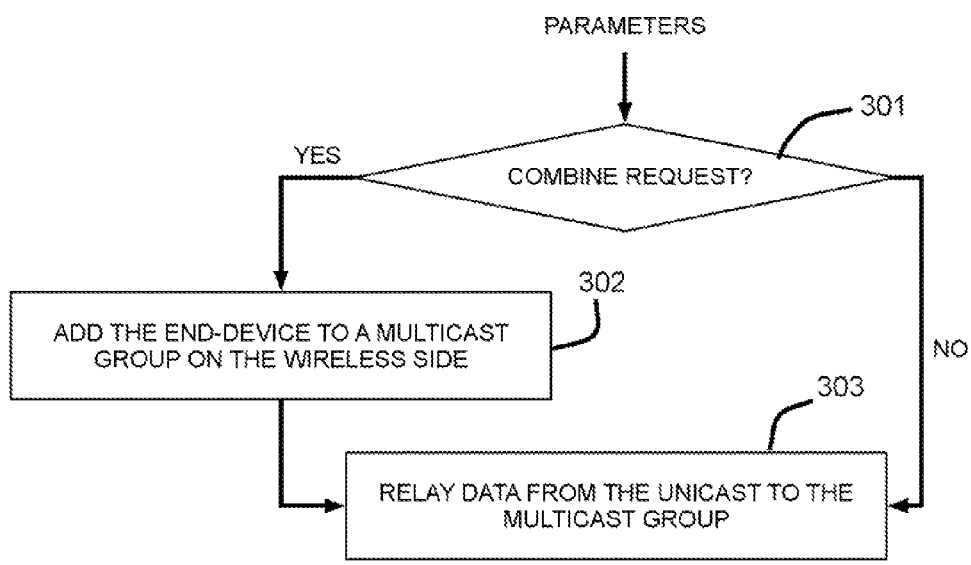
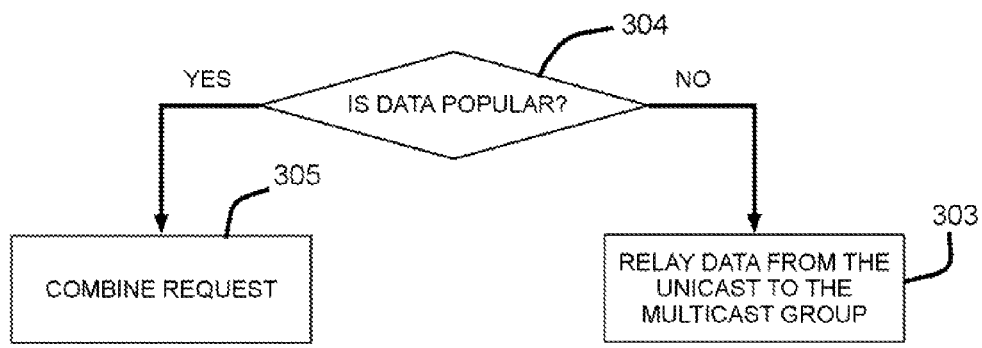
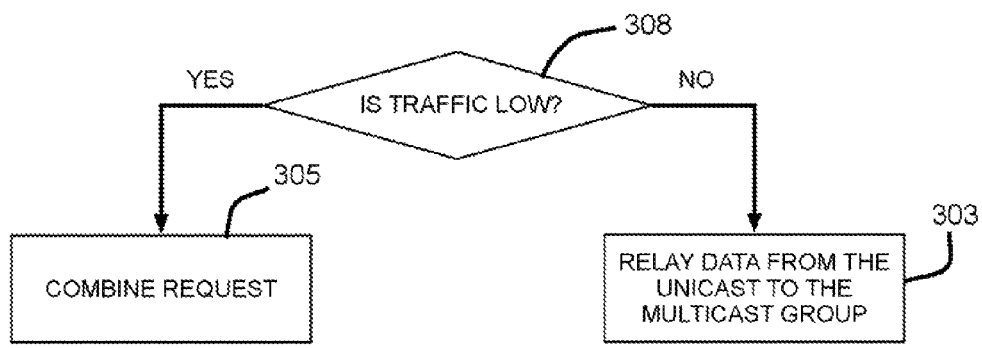

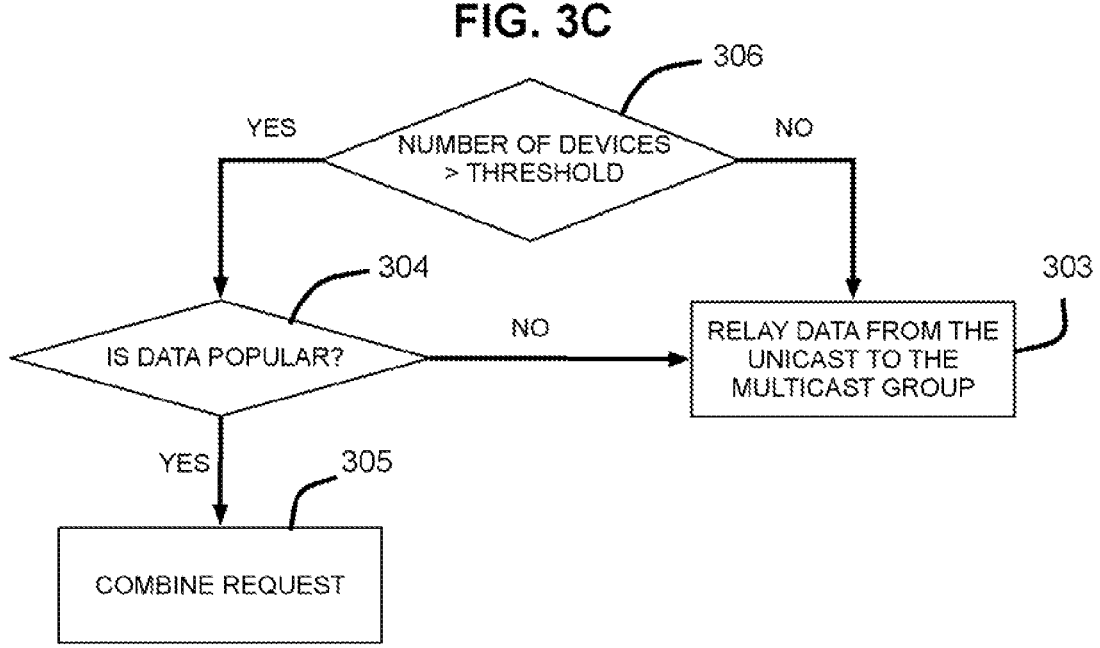
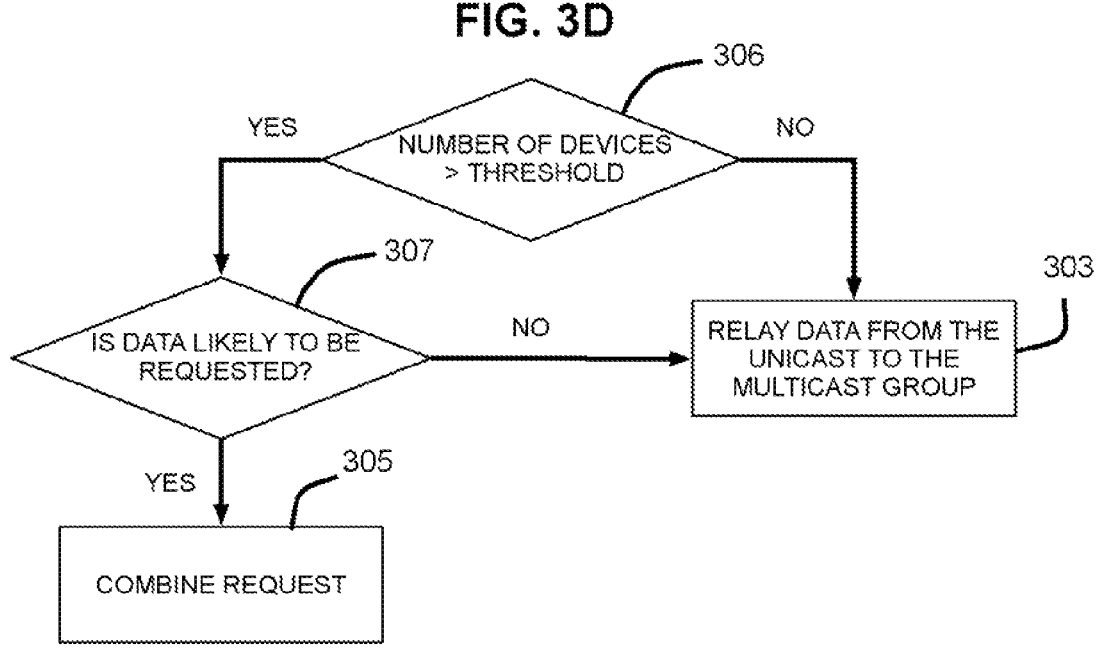

MULTI-STREAM COMMUNICATION

BACKGROUND

1. Technical Field

The present application relates to multi-stream communication methods and more particularly to bandwidth efficient multi-stream communication.

2. Discussion of Related Art

For a large class of video applications, a single stream of traffic is transmitted to multiple users. Existing video applications send multiple unicast streams of traffic between a core server and end-devices.

Many high-bandwidth applications broadcast from the core server to multiple different end-devices, including mobile handsets. Video streaming, such as for mobile video-conferencing, is a feature that is increasingly commonly among these device. Bandwidth constraints on a backhaul infrastructure of a cellular network carrier and limited wireless spectrum of a last-hop may limit performance of video-intensive applications.

Therefore, a need exists for bandwidth efficient multi-stream communication.

BRIEF SUMMARY

According to an exemplary embodiment of the present disclosure, a method for reducing bandwidth used in multiple transmissions on a cellular network includes mapping at least one request of at least one end-device to a unicast channel between server and an intermediary in the network, creating a correlated multicast communication channel between the intermediary and the at least one end-device, and transferring data from the unicast channel to a multicast channel at the intermediary.

According to an exemplary embodiment of the present disclosure, a method for converting a unicast stream carrying content to an end-device in a communications network to a multicast stream includes receiving a plurality of connection requests from a plurality of devices including the end-device, determining that the connection requests are to be combined, adding the end-device to a multicast group, and relaying the content of the unicast stream to the multicast stream.

According to an exemplary embodiment of the present disclosure, a system including an edge device in communication with a plurality of devices consuming content, wherein the edge device is disposed between the plurality of devices and a server, the edge device comprising a processor determining a parameter of the content consumption and executing a plurality of rules taking the parameter as input for combining a plurality of unicast streams between the edge device and the plurality of devices into a multicast stream.

BRIEF DESCRIPTION OF THE SEVERAL VIEWS OF THE DRAWINGS

Preferred embodiments of the present disclosure will be described below in more detail, with reference to the accompanying drawings:

FIG. 3A-E are flow charts of exemplary methods for multi-stream communication according to an embodiment of the present disclosure.

DETAILED DESCRIPTION

Figure 1A:
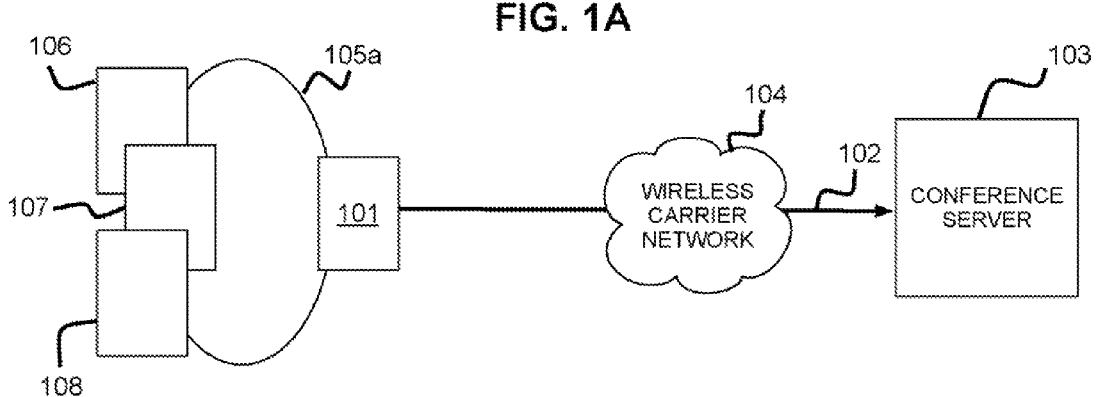
FIGS. 1A-B show an exemplary end-to-end cellular network application according to an embodiment of the present disclosure.
Figure 1B:
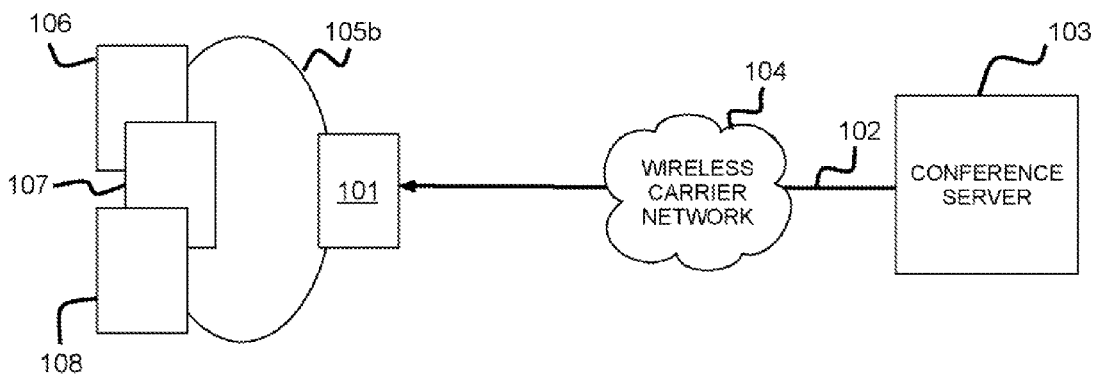

According to an embodiment of the present disclosure, an intelligent edge device 101, e.g., a Base Station (BS) or Radio Network Controller (RNC) executing an appropriate application, can combine multiple unicast streams 105a sent to end-devices 106-108 into a single unicast stream 102 for transmission by a server 103 over a wired backhaul infrastructure 104. The intelligent edge device 101 can receive a single unicast stream 102 over the wired backhaul infrastructure 104 and convert the transmission to a single multicast stream 105b on a wireless last-hop to the end-devices 106-108. FIGS. 1A-B show an exemplary structure of a cellular network on which the end-devices 106-108 can access a service such as video-conferencing or web-conferencing offered by the server 103.

The edge device 101 may be embodied as a general-purpose server having memory to store packets of content and one or more processors for processing packets. The edge device 101 may be embodied as specialized hardware including, for example, a memory buffer at a network interface (NIC) and a hardware accelerator for performing pattern matching, data parsing (HTML/XML parsing, MPEG4 parsing, etc.), compression/decompression, and the like. That is, the edge device 101 may determine parameters of the communication connections with the end devices and execute one or more rules based taking the parameters as input.

Each of the end-devices 106-108, e.g., mobile handset users, connects to the server 103 and uploads content up to the server 103. The server 103 mixes a feed from the end-devices 106-108 and rebroadcasts a single merged stream 102 to the end-devices 106-108. Thus, system comprises two parallel streams—one stream, or set of streams, coming from the end-devices 106-108 to the server 103, and another stream, or set of streams, coming from the server 103 to each of the end-devices 106-108.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

According to an exemplary embodiment of the present disclosure, an edge device 101, e.g., an Internet base Radio Station or Internet based TV station, broadcasts information on the data network 105b to the end-devices 106-108. The information may be embodied in multiple streams communicated to the end-devices 106-108 independently, but carrying substantially the same data.

Referring to FIG. 3A, a method performed by the intelligent edge device 101 converts between the unicast stream 102 and the multicast stream 105b. When specific connection requests are made by one or more of the end-devices 106-108 to the application running on the server 103, the intelligent edge device 101 decides whether the request needs to be combined with another request (301) and if so, then the intelligent edge device 101 adds the end-device to a multicast group on the wireless side (302). The intelligent edge device 101 relays information from the unicast stream to the multicast stream (303).

The edge device 101 may use deep packet inspection to examine data and/or session tracking to determine a parameter used in making a determination to combine. For example, the decision of whether the request needs to be combined with another request (301) can be determined using a set of predefined rules. The rules may depend on a website or application being accessed, and/or the number of user devices concurrently accessing the stream from a same area of the network and/or the network traffic conditions (e.g., links being congested at the wireless and/or wired part of the network). For example, if a media stream can be served both in a unicast and a multicast mode then the multicast mode will be selected independently of the number of user devices accessing the same media stream. In another example, if there are two or more user devices accessing the same media stream then their streams will be combined in the case where user devices have the capability to switch from a unicast stream to a multicast stream. Yet in different example, if the available bandwidth on the wireless and/or wired link is getting close to saturation and there are streaming media applications used by two or more user devices, then they will be combined in the case that user devices have the capability to switch from a unicast stream to a multicast stream.

The addition of the end-device to the multicast group on the wireless side (302) may be executed by managing a set of members of the multicast group.

The relay of information (303) may be performed by data copying/relaying.

Figure 2:
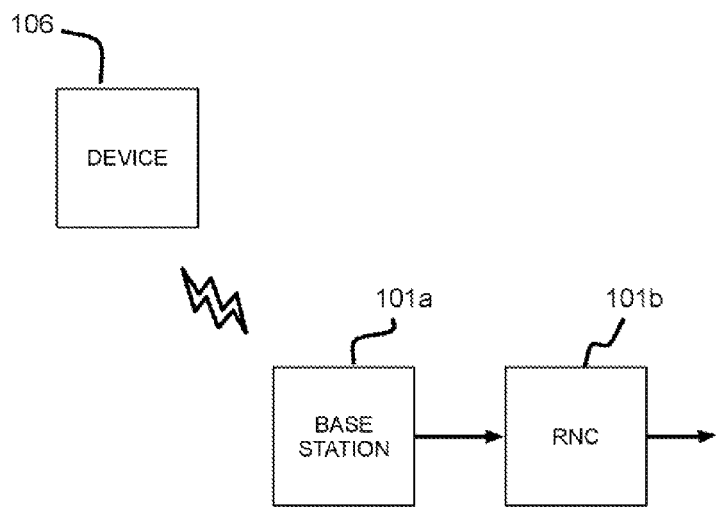
FIG. 2 is a diagram of a last-hop portion of the cellular network of FIGS. 1A-B according to an embodiment of the present disclosure.

Accordingly to an exemplary embodiment of the present disclosure, in a variation of FIGS. 1-3, the conversion of multiple unicast streams to one multicast stream can be done for applications other than streaming media. For example, it can be applied to media downloads from different devices that happen in different time frames (e.g., video downloads over HTTP). The multicast stream may be used to opportunistically transfer the data being requested or to be requested staggered in time by the different users. For example, consider an environment where end-devices are downloading the same content staggered in time, such as in a case of popular on-demand content (e.g., a television program or movie). The content is locally stored to all of the end-devices even if the content is not being displayed by a particular end-device currently. When a user wants to watch the show, it may be played from a local storage of the respective end-device and when the content of the local storage is exhausted, Old content can be removed using a replacement policy (e.g., a least recently used replacement policy).

The decision of whether multiple requests staggered in time for the same data need to be combined together (block 301, FIG. 3A) can be determined using a set of predefined rules and input parameters. These rules may depend on the data being requested, and/or on the number of users being in the same are of the network, and/or on the relations between the users being in the same are of the network and/or the network traffic conditions (e.g. links being congested at the wireless and/or wired part of the network). That is, the parameters may include various types of input, such as the number of users, relations between users, network traffic, etc.

An exemplary rule may determine to combine multiple requests if the requested data is popular or is forecasted to become popular (block 304, FIG. 3B), then instead of using a unicast stream to access the data, a multicast stream is used (305) and all users (or subset of them) that are connected to the same base-station will store the popular data. In another example, if the number of devices connected to the same base-station is exceeding a threshold (block 306, FIG. 3C) (or greater than or equal to the threshold) and the requested data is popular (304) then a multicast stream is used for all users (305). In a different example, when there are multiple devices connected to the same base-station (block 306, FIG. 3D) and the devices are expected to access the requested data in some future time (block 307, FIG. 3D) then a multicast stream is used for the users (305). In yet another example, in periods of time when the network traffic is low (block 308, FIG. 3E), a user request for some data is transitioned to a multicast stream (305) and other devices connected to the same base-station also store the data received from the multicast stream.

Accordingly to an exemplary embodiment of the present disclosure, in a variation of FIGS. 1-3, certain data (e.g. data that is currently popular or it is forecasted to become popular) can be pushed to multiple devices using a single unicast stream, without a request from the devices for the content. The data push can happen by using a set of predefined rules. These rules may depend on the number of users being present in a certain area of the network, and/or the relations between the users being present on the same area of the network, and/or the use the network traffic conditions. For example, the data push can be triggered when a number of devices connected to the same base-station exceeds a threshold. In another example, the data push can be triggered when multiple users are connected to the same base-station and are expected to access the same content sometime in the future. In a yet another example, in periods of time when network traffic is low, popular content can be pushed using a single multicast stream to multiple user devices connected to the same base-station.

Accordingly to an exemplary embodiment of the present disclosure, a method for multi-stream communication enables the replacement of multiple unicast streams (accessing the same content, either concurrently or at different timeframes) with a combined unicast stream (at the wired network). The multicast stream (at the wireless network) may be used instead of concurrent unicast streams (search results) and/or unicast streams staggered in time (unique feature of our disclosure). This enables efficient delivery of content, accesses by multiple end-devices at the same and/or different times, both at the wired and the wireless network.

The methodologies of embodiments of the invention may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
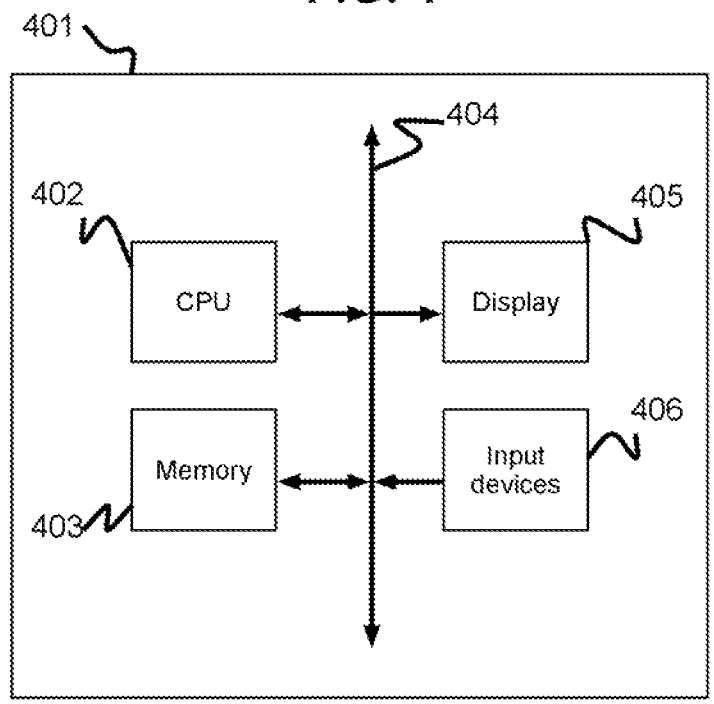
FIG. 4 is an exemplary system for locating a bottleneck thread in a multi-threaded application according to an embodiment of the present disclosure.

For example, FIG. 4 is a block diagram depicting an exemplary system for multi-stream communication. The system 401 may include a processor 402, memory 403 coupled to the processor (e.g., via a bus 404 or alternative connection means), as well as input/output (I/O) circuitry 405-406 operative to interface with the processor 402. The processor 402 may be configured to perform one or more methodologies described in the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A computer program product for reducing bandwidth used by multiple transmissions, the computer program product comprising:

a non-transitory computer readable storage medium having computer readable program code embodied therewith, the computer readable program code comprising:

computer readable program code configured to transmit data between a server and at least one end-device of a wireless carrier network in a unicast channel;

computer readable program code configured to determine whether the at least one end-device is capable of switching between the unicast channel and a multicast channel and, when it is determined that the at least one end-device is capable of the switching, the transmission of data between the server and the at least one end-device is switched to the unicast channel, wherein the switching comprises:

mapping at least one request of the at least one end-device to the unicast channel, the unicast channel being between the server and an intermediary disposed between a wired backhaul infrastructure of the wireless carrier network and a wireless last-hop to the at least one end device;

creating the multicast channel as a correlated multicast communication channel between the intermediary and the at least one end-device, the multicast communication channel instantiated within the wireless last-hop; and transferring the data from the unicast channel to the multicast channel at the intermediary.

2. The computer program product of claim 1, further comprising computer readable program code configured to combine the at least one request with at least one additional request of the at least one end-device.

3. The computer program product of claim 2, further comprising computer readable program code configured to create a multicast group including each end-device.

4. A computer program product for converting a unicast stream carrying content to an end-device of a wireless carrier network in a communications network to a multicast stream, the computer program product comprising:

a non-transitory computer readable storage medium having computer readable program code embodied therewith, the computer readable program code comprising:

computer readable program code configured to receive a plurality of connection requests from a plurality of wireless devices including the end-device;

computer readable program code configured to determine that the connection requests are to be combined;

computer readable program code configured to add the end-device to a multicast group when it is determined that the connection requests are to be combined; and computer readable program code configured to transmit the content of the unicast stream within the multicast stream when it is determined that the connection requests are to be combined, wherein the transmission of the content of the unicast stream within the multicast stream is performed by an edge device disposed between a wired backhaul infrastructure of the wireless carrier network and a wireless last-hop to the plurality of wireless devices, and wherein the determining that the connection requests are to be combined includes determining that the end-device is capable of switching from the unicast stream to the multicast stream.

5. The computer program product of claim 4, wherein the computer readable program code configured to determine that the connection requests are to be combined further comprises:

computer readable program code configured to receive a parameter; and computer readable program code configured to execute a rule for making the determination.

6. The computer program product of claim 4, wherein the computer readable program code configured to determine that the connection requests are to be combined further comprises: computer readable program code configured to compare a number of the connection requests to a threshold.

7. The computer program product of claim 4, wherein the computer readable program code configured to determine that the connection requests are to be combined further comprises:

computer readable program code configured to receive a value indicating a number of devices connected to a server; and computer readable program code configured to compare the number of devices to a threshold.

8. The computer program product of claim 4, wherein the computer readable program code configured to determine that the connection requests are to be combined further comprises:

computer readable program code configured to determine an indication of traffic between a server and the devices; and computer readable program code configured to compare the indication of traffic to a threshold.

9. The computer program product of claim 4, wherein the computer readable program code configured to determine that the connection requests are to be combined further comprises:

computer readable program code configured to determine a likelihood of the content being requested; and computer readable program code configured to compare the likelihood to a threshold.

10. A system comprising an edge device in communication with a plurality of devices of a wireless carrier network consuming content, wherein the edge device is disposed between a wired backhaul infrastructure of the wireless carrier network and a wireless last-hop to the plurality of devices, the plurality of devices being in communication with a server via the wireless carrier network and the wired backhaul infrastructure thereof, the edge device comprising a processor determining a parameter of the content consumption and executing a plurality of rules taking the parameter as input for combining a plurality of unicast streams between the edge device and the plurality of devices into a multicast stream, wherein it is determined whether the plurality of devices is capable of switching between the unicast stream and the multicast stream and the combining of the plurality of unicast streams into a multicast stream is performed when it is determined that the plurality of devices is capable of switching between the unicast stream and the multicast stream.

11. The system of claim 10, wherein the edge device identifies the plurality unicast streams by inspecting packet payload of the consumed content.

12. The system of claim 10, wherein the edge device identifies the plurality unicast streams by session tracking.

13. The system of claim 10, wherein the edge device combines the plurality of unicast streams corresponding to a plurality of connection requests from the plurality of devices, determines that the connection requests are to be combined, adds the plurality of devices to a multicast group, and relays the content of the unicast stream to the multicast stream.

14. The system of claim 13, wherein the edge device compares a number of the connection requests to a threshold.

15. The system of claim 13, wherein the edge device determines that the connection requests are to be combined according to traffic between the server and the plurality of devices and a threshold for traffic.

16. The system of claim 13, wherein the edge device determines that the connection requests are to be combined by determining a likelihood of specific content being requested and comparing the likelihood to a threshold for the likelihood.

* * * * *